Sept. 15, 1925.  
W. A. KYSOR  
TRAILER  
Filed Jan. 18, 1923   3 Sheets-Sheet 1
1,554,102
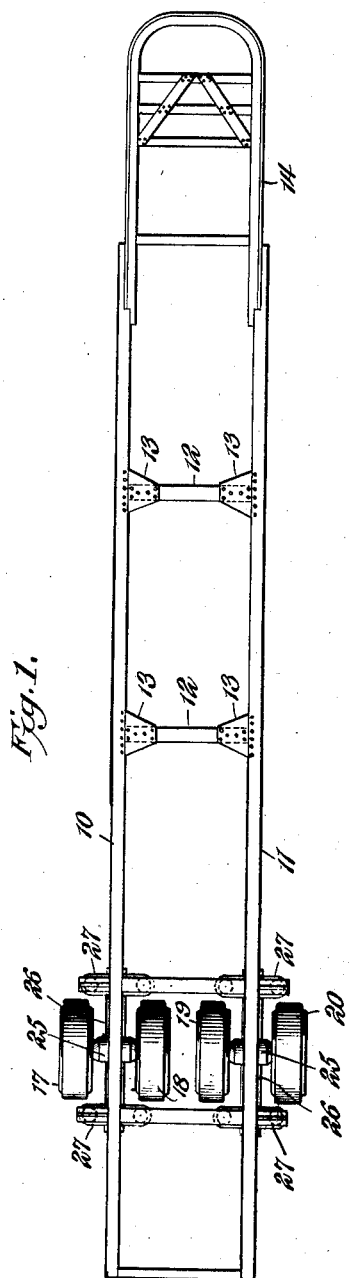
WITNESSES  
Howard D. Orr.  
E. N. Lovewell
BY
W. A. Kysor,  
INVENTOR,
ATTORNEY Sept. 15, 1925.
W. A. KYSOR
1,554,102
TRAILER
Filed Jan. 18, 1923
3 Sheets-Sheet 2
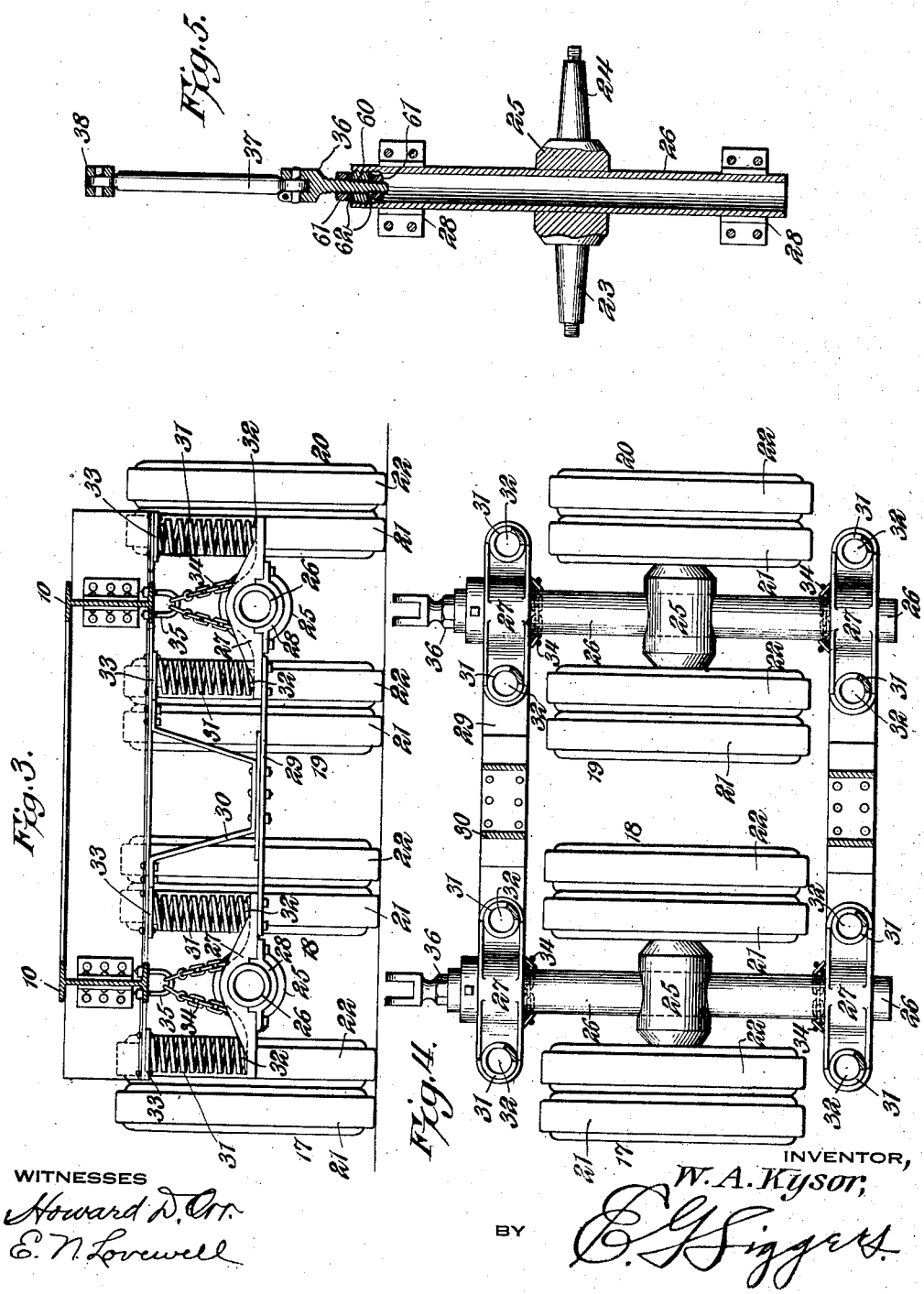

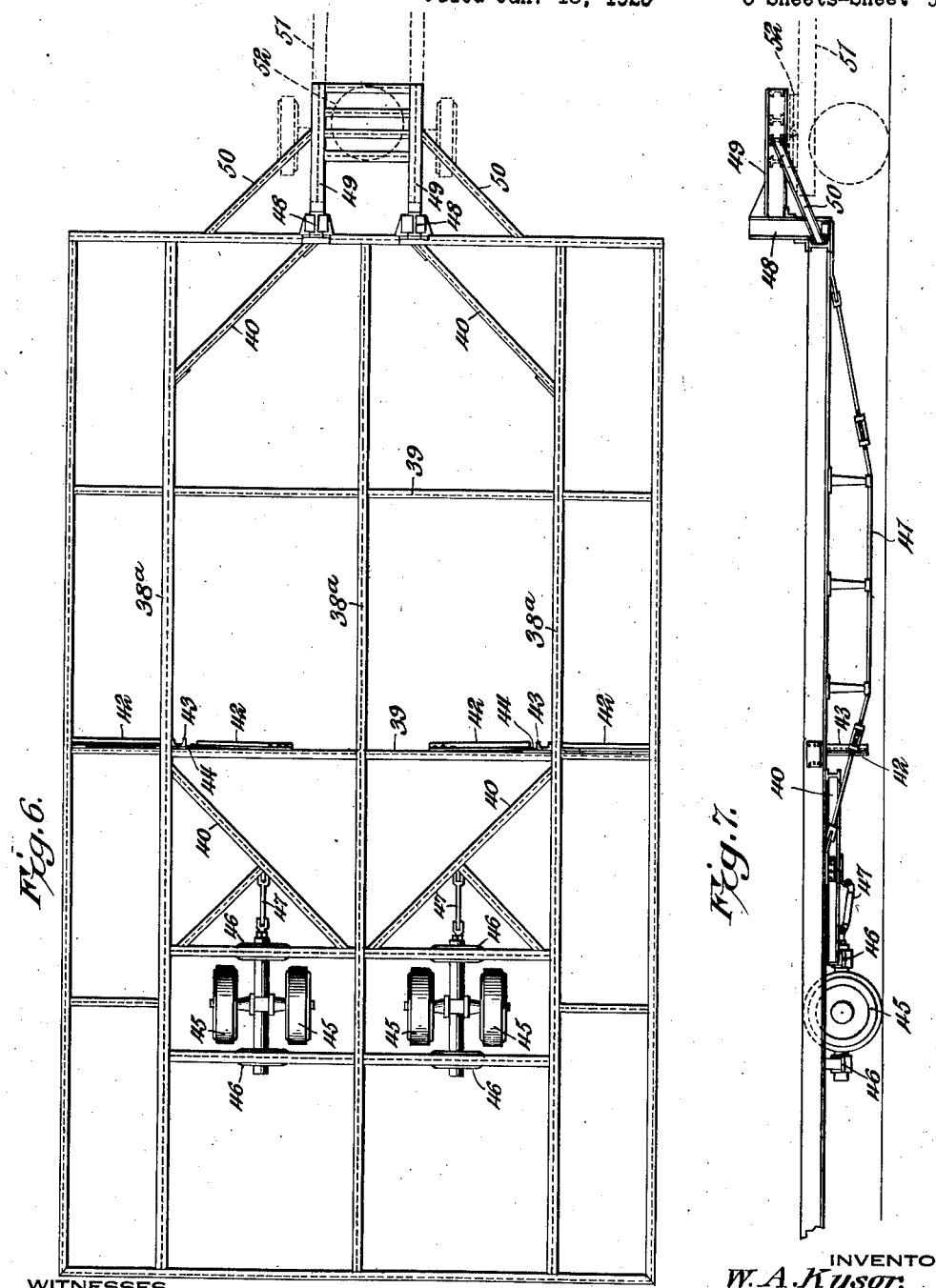

Patented Sept. 15, 1925.

1,554,102

UNITED STATES PATENT OFFICE.

WALTER A. KYSOR, OF CADILLAC, MICHIGAN.

TRAILER.

Application filed January 18, 1923. Serial No. 613,418.

*To all whom it may concern:*

Be it known that I, WALTER A. KYSOR, a citizen of the United States, residing at Cadillac, in the county of Wexford and State of Michigan, have invented new and useful Improvements in Trailers, of which the following is a specification.

My invention relates to a trailer adapted to be used in connection with a motor truck for hauling heavy loads.

The general object of the invention is to provide means for distributing the weight of the trailer and its load over the surface of the road in such a manner that loads up to twenty-five or even thirty-five tons in weight may be hauled without violating the laws of the various States which limit the maximum load to be carried per inch of tire width.

The trailer of which the present invention forms a part is supported at its front end by a motor truck or other vehicle to which it is connected by means of a fifth wheel. The trailer is supported at its rear end by a truck that bears the greater part of the load, and which comprises a plurality of pairs of wheels mounted abreast, each pair having a separate axle mounted to oscillate about a longitudinal axis, whereby the wheels may conform to an irregular or crowned road surface so that the load is uniformly distributed, and each wheel supports its proper share of the weight.

The invention is adapted to be used for long distance freight hauling where economy demands that the maximum load shall be carried. For this purpose, the trailer frame will preferably be long and comparatively narrow. The supporting truck will consist of two pairs of wheels with the wheels of each pair spaced about three feet apart, and the maximum width over all will be not more than eight feet, since the laws of some States thus limit the width of vehicles which may be lawfully used on the highway. The preferred length of the trailer frame in this case will be about thirty feet. Incidentally, the wheels of the supporting truck, when spaced in this manner, will straddle the rut on each side of the road, a feature which is very desirable from the standpoint of road upkeep.

The invention is also adapted to be used in connection with a trailer built especially for moving houses and similar large bulky objects. In carrying out the idea for this purpose, the trailer frame is made considerably wider than for freight hauling and will set close to the ground, the pairs of truck wheels being placed correspondingly far apart.

The invention will be best understood from the following detailed description, taken in connection with the accompanying drawings, in which:—

Fig. 1 is a plan view of the invention as applied to a long distance freight trailer.

Fig. 2 is a side elevation of the same.

Fig. 3 is a rear elevation of the supporting truck with the trailer body shown in section.

Fig. 4 is a plan view of the same with parts shown in section.

Fig. 5 is a detail view of one of the axles and the means connecting it to the trailer frame.

Fig. 6 is a plan view of the invention as applied to a house moving truck.

Fig. 7 is a side elevation of the same.

The trailer frame shown in Figs. 1 and 2 comprises longitudinal sills 10 and 11 connected by transverse brace beams 12 which are suitably held in rigid relation by gusset plates 13. The forward part of the trailer frame has a coupling frame 14 rigidly secured thereto, supported on a fifth wheel 15 which is connected to the rear end of a truck 16 somewhat in advance of its rear axle.

The rear portion of the trailer frame is supported by a truck which includes a plurality of pairs of wheels 17, 18, 19 and 20, each wheel preferably having a double tread, as indicated at 21 and 22, in Figs. 3 and 4.

Each pair of wheels is mounted upon the outer ends 23 and 24 of an axle by means of roller bearings of a heavy type, whereby to withstand the severe usage to which the trailer is subjected. The axle is provided centrally with a large hub 25 having a longitudinal bore adapted to receive a shaft 26 of large size, which is fixedly secured to the hub by welding or the like. In practice, the shaft 26 has been made hollow and with an outside diameter of six inches. Each shaft 26 is journaled at each end in a pillow block 27 closed by means of a cap 28 to form a suitable bearing; thus it will be seen that each pair of supporting truck wheels is oscillatable with the shaft 26 in the pillow blocks 27, so that the wheels will at all times engage equally the surface of the roadway and each wheel will support an equal load. Each pillow block is rigidly connected to the corresponding pillow block of the other pair of wheels by means of a flat bar 29 of spring steel which is connected by a brace bar 30 to the frame of the trailer to form a comparatively rigid structure. The trailer frame is supported by heavy coiled springs 31 similar to those used on railway coaches, two springs being provided for each pillow block and held between bosses 32 on the pillow block and corresponding bosses on the plate 33 secured to the under side of the trailer frame. It will be understood that the bar 29 holds the pillow blocks rigidly spaced apart and yet yields sufficiently to permit the springs 31 to be compressed under a heavy load. A heavy chain 34 extends around each end of the shaft 26 adjacent the pillow block and has its ends connected with a U-bolt 35 or the like secured to the under side of the trailer frame. The chains are so adjusted that at the point where the springs become completely expanded the chain becomes tight so that further separation is impossible, and consequently the springs cannot get away from the bosses.

In order to brace the supporting truck against longitudinal movement with respect to the trailer frame and to protect it against undue strains from a sudden obstruction, each shaft 26 is internally threaded at its forward end and receives a head 60 in which a pin 36 is swiveled, the pin being held against longitudinal movement in the head by nuts 61 and washers 62. The forward end of the pin is bifurcated and pivotally connected to a radius rod 37, which is in turn pivotally connected to a bracket 38 depending from one of the longitudinal sills of the trailer frame. Thus it will be seen that the spring tie bar 29 and the radius rods 37 absolutely fix the position of the truck in regard to the frame. In other words, the frame cannot possibly tip in any direction on the springs, and for this reason no further attachment is necessary to keep the springs in position. The swiveled connection between the pin 36 and shaft 26 permits the latter to rock so that the wheels may always follow the surface of the road.

In Figs. 6 and 7, the invention as shown in connection with a large comparatively wide trailer frame which is adapted for moving buildings. This frame consists of a plurality of longitudinally extending beams 38ª and transverse beams 39, suitably braced by diagonal beams 40, the whole being securely riveted together to form a rigid structure, as will be readily understood by those skilled in the art. The frame is braced against longitudinal flexure by truss rods 41, and is similarly braced against transverse flexure by downwardly-inclined braces 42 which are connected to a vertical truss bar 43, by means of suitable plates 44 in a well known manner. The trailer frame, in this instance, is supported by pairs of truck wheels 45 which are spaced farther apart than in the long haul freight trailer to correspond with the greater width of the trailer frame. Each pair of wheels 45 is supported in pillow blocks 46 similar to the blocks 27 heretofore described, and connected by a suitable radius rod 47 to one of the brace bars of the frame.

The trailer frame is supported close to the surface of the road and is provided at its forward end with upstanding posts 48 having forwardly-extending beams 49 braced by suitable brace beams 50, all securely and rigidly held together by angle plates, and connected to the truck 51 by means of a fifth wheel 52.

In the above description, I have explained the invention in its preferred form, and in the relations in which it has been heretofore used, but it will be understood that it is capable of many other modifications and adaptations, and that the invention is limited only by the scope of the appended claims.

What is claimed is:—

1. A truck for supporting a vehicle frame, including a pair of normally alined axles, wheels in supporting relation to the ends of the axles, each axle having a central hub, a longitudinal shaft fixed to the hub, means for revolubly supporting the ends of the shaft, and means for holding the shaft against longitudinal movement with respect to the frame but permitting the shaft to rock on its axis.

2. A truck for supporting a vehicle frame including a pair of normally alined axles, wheels in supporting relation to the ends of the axles, each axle having a central hub, a longitudinal shaft fixed to the hub and extending beyond the wheels, a fixed pillow block at each end of the shaft outside the wheels and revolubly supporting the shaft, and means for holding the pillow blocks aginst longitudinal movement with respect to the frame.

3. The combination with a vehicle frame, of a supporting truck therefor, including a wheeled axle, a rockable shaft extending at right angles to said axle and secured to the latter midway between the wheels, and means connecting the end of the shaft to the frame, and holding the shaft against relative longitudinal movement but permitting it to rock on its axis.

4. The combination with a vehicle frame, of a supporting truck therefor including a wheeled axle, a rockable shaft extending through the axle at right angles thereto beyond the wheels and rigidly secured to said axle midway between the wheels, a truck frame outside the wheels having pillow blocks journaled on the ends of said shaft, and flexible means connecting the supporting truck to the vehicle frame and holding it against longitudinal movement with respect thereto but permitting the shaft to rock independently thereof.

5. A truck for supporting a vehicle frame including a pair of normally alined axles, wheels in supporting relation to the ends of the axles, each axle having a central hub, a longitudinal rockable shaft extending through and fixed to the hub, a pillow block at each end of the shaft beyond the wheels and revolubly supporting the shaft, springs interposed between the frame and the pillow blocks at each side of the shaft, means for maintaining the pillow blocks of one shaft at a fixed distance from the corresponding pillow blocks of the other shaft, and means for holding the pillow blocks against longitudinal movement with respect to the frame.

6. A vehicle comprising a supporting truck having two pairs of wheels abreast, an axle for each pair of wheels and having a longitudinal rockable shaft rigidly connected centrally of the axle and extending beyond the wheels, a pair of pillow blocks outside the wheels in which the ends of the shaft are journaled, a vehicle frame having its rear end resiliently supported from the pillow blocks, springs interposed between the frame and the pillow blocks, means for holding the frame from tipping on the springs in any direction, and means for holding each of said shafts against relative longitudinal movement but permitting the shafts to rock on their axes.

7. A vehicle comprising a supporting truck having two pairs of wheels abreast, an axle for each pair of wheels and having a longitudinal rockable shaft rigidly connected centrally thereof and extending beyond the wheels, a pair of pillow blocks also located outside the wheels in which the shaft is journaled, a vehicle frame having its rear end resiliently supported from the pillow blocks, and a bar connecting the pillow block of one shaft to the corresponding pillow block of the other shaft so as to provide a relatively rigid structure.

8. A vehicle comprising a supporting truck having two pairs of wheels abreast, an axle for each pair of wheels and having a longitudinal shaft rigidly connected centrally thereof, a pair of pillow blocks in which the shaft is journaled, coiled springs resting on the pillow blocks, a vehicle frame supported at its rear end on said springs, a bar of spring steel connecting the pillow block of one shaft to the corresponding pillow block of the other, said spring steel bar being yieldable to permit the frame to settle on the coiled springs.

9. A vehicle comprising a supporting truck having two pairs of wheels abreast, an axle for each pair of wheels, each axle having a central hub with a longitudinal rockable shaft extending therethrough beyond the wheels and rigidly connected to the hub, a pair of pillow blocks outside the wheels in which the ends of the shaft are journaled, a vehicle frame having its rear end resiliently supported from the pillow block but held from tipping in any direction on the resilient support, each of said shafts having a pin in threaded connection with its forward end, and a radius rod pivotally connected to the end of the pin and extending forwardly and upwardly therefrom.

10. A vehicle comprising a supporting truck having two pairs of wheels abreast, an axle for each pair of wheels and having a longitudinal shaft rigidly connected centrally thereof, a pair of pillow blocks in which the shaft is journaled, coiled springs resting on the pillow blocks, a vehicle frame having its rear end supported by said springs, a bar of spring steel connecting each pillow block of one shaft to the corresponding pillow block of the other shaft, said spring steel bar being yieldable to permit the frame to settle on said springs, a coupling pin in threaded connection with the forward end of each of said shafts, and a radius rod pivotally connected to the end of the pin.

11. A vehicle comprising a supporting truck having two pairs of wheels abreast, an axle for each pair of wheels and having a longitudinal rockable shaft rigidly connected centrally thereof, a pair of pillow blocks in which the shaft is journaled beyond the wheels, means for connecting the pillow block of one shaft to the pillow block of the other shaft, a vehicle frame having its rear end resiliently supported from the pillow blocks, and means for holding each of said shafts against relative longitudinal movement, said means including a radius rod connected to the forward end of the shaft and to the frame in front of said shaft, the radius rods in combination with the means for connecting the pillow blocks holding the frame from tipping in any direction on the springs but permitting the shafts to rock on their axes.

12. A vehicle comprising a supporting truck having two pairs of wheels abreast, an axle for each pair of wheels and having a longitudinal shaft rigidly connected centrally thereof, a pair of pillow blocks in which the shaft is journaled, a vehicle frame having its rear end resiliently supported from the pillow blocks, a bar connecting the pillow block of one shaft to the corresponding pillow block of the other shaft, and means including a radius rod connecting each shaft to the frame and holding it against longitudinal movement with respect thereto.

13. A vehicle comprising a supporting truck having two pairs of wheels abreast, an axle for each pair of wheels and having a longitudinal shaft rigidly connected centrally thereof, a pair of pillow blocks in which the shaft is journaled, coiled springs resting on the pillow blocks, a vehicle frame supported at its rear end on said springs, a bar of spring steel connecting the pillow block of one shaft to the corresponding pillow block of the other shaft, a bracing means between the spring steel bar and the vehicle frame, said spring steel bar being yieldable to permit the frame to settle on the coiled springs, and means including a radius rod connecting each shaft to the frame and holding it against longitudinal movement with respect thereto.

14. A vehicle comprising a supporting truck having two pairs of wheels abreast, an axle for each pair of wheels, each axle having a central hub with a longitudinal shaft extending therethrough and rigidly connected to the hub, a pair of pillow blocks in which the shaft is journaled, a vehicle frame having its rear end resiliently supported from the pillow block, each of said shafts having a swiveled pin, a radius rod pivotally connected to the end of the pin and extending forwardly and upwardly therefrom, and a depending bracket rigidly secured to the vehicle frame and pivotally connected to the forward end of the radius rod whereby said shafts are held against longitudinal movement with respect to the vehicle frame.

15. A vehicle comprising a supporting truck having two pairs of wheels abreast, an axle for each pair of wheels and having a longitudinal shaft rigidly connected centrally thereof, a pair of pillow blocks in which the shaft is journaled, coiled springs resting on the pillow blocks, a vehicle frame having its rear end supported by said springs, a bar connecting the pillow block of one shaft to the corresponding pillow block of the other shaft, a coupling pin in threaded connection with the forward end of each of said shafts, a radius rod pivotally connected to the end of the pin, and a bracket rigidly secured to and depending from the vehicle frame and pivotally connected to the forward end of the radius rod whereby to hold the wheeled truck frame against longitudinal movement with respect to the vehicle frame.

16. The combination with a vehicle frame, of a supporting truck for said frame, including a plurality of pillow blocks, coiled springs resting on the pillow blocks and supporting the frame, each pillow block being spaced from the corresponding pillow block at the other side of the frame by a spring steel bar, and a brace bar secured between the spring bar and the frame.

17. The combination with a vehicle frame, of a supporting truck for said frame including pairs of opposed pillow blocks, each pair consisting of a pillow block at each side of the frame, coiled springs resting on the pillow blocks and supporting the frame, a spring steel bar connecting each pillow block with the other pillow block of the same pair, and means connecting the pillow blocks to the vehicle frame to positively limit the upward movement of the latter with respect to the pillow blocks.

18. The combination with a frame, of supporting means therefor, including laterally spaced pillow blocks, expansible coiled springs resting on the pillow blocks in supporting relation to the frame, resilient means for bracing the frame and holding the pillow blocks in spaced relation, and means positively limiting the upward movement of the frame with respect to the pillow blocks.

19. In combination with a shaft, means for mounting the same at each end to turn on its axis, a fixed axle extending outwardly from each side of the shaft midway of its ends, wheels mounted on the ends of the axle, and a pivoted radius rod swivelly connected to one end of the shaft.

20. The combination with a frame, of a supporting truck having a longitudinal rock shaft in supporting relation to said frame, means for mounting the rock shaft to turn on its axis, means for connecting axles thereto, and a radius rod swiveled at its rear end to the forward end of said shaft to permit the shaft to rock and pivotally connected at its front end to said frame.

21. The combination with a frame, bearing members thereon, coiled springs on the bearing members, a longitudinal shaft journaled in the bearing members, wheels connected to the shaft, and a chain at each end of the shaft passing around the same and having its ends connected to the frame for positively limiting the upward movement of the frame, so that when the springs are completely expanded the chain becomes tightened.

In testimony, that I claim the foregoing as my own, I have hereto affixed my signature.

WALTER A. KYSOR.